Aug. 15, 1950     E. WHITE     2,519,166
PLANT RECEPTACLE
Filed June 10, 1946
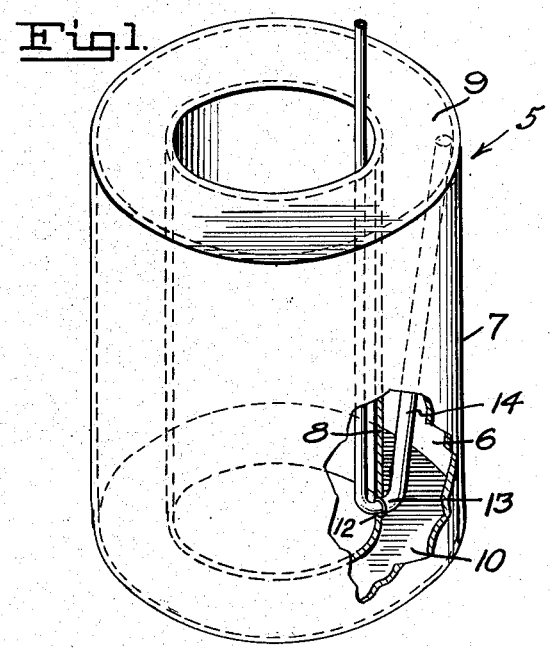
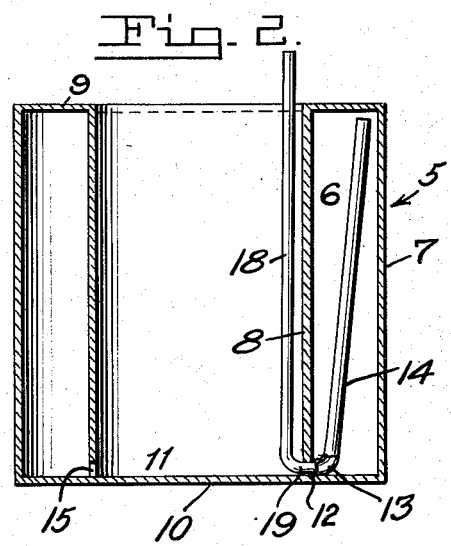
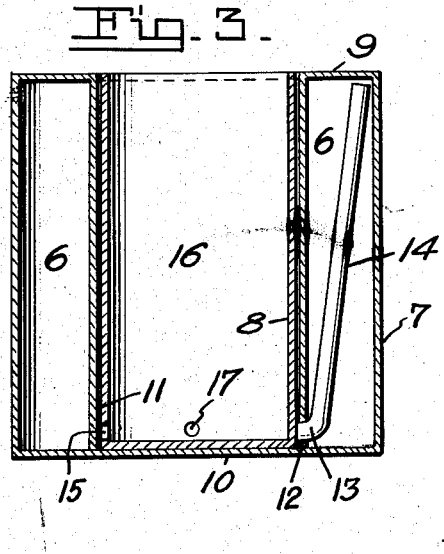
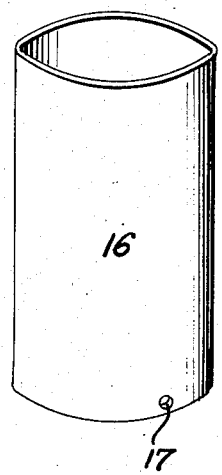
Inventor
Everett White
By *Randolph & Beavers*
Attorneys Patented Aug. 15, 1950

2,519,166

UNITED STATES PATENT OFFICE 2,519,166

PLANT RECEPTACLE

Everett White, Albany, Ohio

Application June 10, 1946, Serial No. 675,519

2 Claims. (Cl. 47—38)

This invention relates to splashproof receptacle for holding and maintaining plants in a moist condition for a considerable period without the necessity of watering the plant.

A primary object of the present invention is to provide a plant receptacle having a reservoir adapted to contain a quantity of water or other liquid to be fed to the plant, and which is so constructed and arranged that the plant may be positioned in the receptacle and the water or other liquid will be supplied thereto from the reservoir for maintaining the plant in a moist condition for a relatively long period of time without the necessity of adding additional water or other liquid to the plant or receptacle.

Still another object of the invention is to provide a receptacle possessing the aforedescribed characteristics which is so constructed that the water contained in the reservoir thereof is substantially enclosed to prevent splashing or spilling incident to moving the receptacle and the plant contained therein.

Various other objects and advantages of the invention will hereinafter become more fully apparent from the following description of the drawing, which illustrates a preferred embodiment thereof, and wherein—

Figure 1 is a perspective view of a receptacle constructed in accordance with the invention;

Figure 2 is a substantially central vertical sectional view, on a reduced scale of the receptacle;

Figure 3 is a similar view showing a removable plant container disposed within the receptacle, and Figure 4 is a perspective view of the removable plant container.

Referring more specifically to the drawing, the numeral 5 designates the improved plant receptacle in its entirety and which includes an annular chamber 6 having an outer wall 7, an inner wall 8, an annular top wall 9 and a bottom wall 10. The bottom wall 10 in addition to closing the bottom of the chamber or reservoir 6 has a central portion, forming an integral part thereof, which forms the bottom of the well 11. The inner wall 8 defines the side wall of the well 11 and the annular top wall 9 and the upper edge of the inner wall 8 define the open upper end of said well 11.

The inner wall 8 is provided with an opening 12 adjacent a portion of the bottom 10 in which the outturned end 13 of a tube or pipe 14 is disposed. The tube 14 extends upwardly in the reservoir 6 and has its opposite end disposed beneath and adjacent to the top wall 9. The inner wall 8 is provided with one or more openings 15 adjacent the bottom 10 which forms a communicating port or ports between the well 11 and reservoir or annular container 6.

An open top container 16 having an annular side wall and a substantially flat bottom, is adapted to be mounted in the well 11 with the bottom thereof resting on the central portion of the bottom 10. The external diameter of the container 16 is somewhat smaller than the internal diameter of the wall 8 so that a space will be provided therebetween. The container 16 is provided with one or more openings 17 in the side wall thereof and adjacent its bottom.

A tube 18 is provided with a curved end 19 which is sized to detachably fit into the tube end 13. The tube 18 is of sufficient length so that when the end portions 13 and 19 are joined, as seen in Figures 1 and 2, the tube 18 will extend upwardly to above the top of the receptacle 5.

Assuming that the tubes 14 and 18 are connected, as illustrated in Figures 1 and 2, to fill the reservoir 6, water or other liquid, not shown, is poured into the well 11 and will flow through the opening or openings 15 into the reservoir 6. The air in the reservoir 6 will be vented through the connected tubes 14 and 18 so that the well 11 and reservoir 6 can be filled to adjacent the top of the receptacle 5. The opening or openings 15 are then closed as by placing the finger thereagainst after which the receptacle 5 is tilted to pour the water from the well 11. As the reservoir 6 will be sealed to prevent the entrance of air thereto during this operation, the water will be retained in the reservoir 6 while being emptied from the well 11. The tube 18 can then be removed and the container 16 positioned in the well 11, as illustrated in Figure 3. The container 16 is adapted to contain a plant and it will be readily apparent that the water or other liquid from the reservoir 6 will flow from the openings 15 into the well space 11 surrounding the container 16 and through the opening or openings 17 into the container 16 for maintaining the plant contained therein in a moist condition, until all of the liquid has been dispensed from the annular reservoir 6. It will thus be readily apparent that the reservoir 6 will function to maintain the plant in a moist condition for a long period of time. Further, it will be readily apparent that the receptacle 5 with the container 16 and plant, not shown, supported thereby, may be moved about without danger of splashing the water or other liquids therefrom. The reservoir 6 can be emptied by engaging the tubes 14 and 18, and inverting the receptacle 5 so that the liquid will flow outwardly through the conduit 14, 18, while the reservoir 6 is being vented through the opening or openings 15.

Obviously, the drawing and preceding description merely disclose a simple embodiment of the invention and numerous modifications and changes are contemplated and may be resorted to, including variations in the shape of the receptacle 5 and in the number, location and size of the communicating openings between the reservoir and plant container. Also, the receptacle 5 may be constructed with the inner wall thereof spaced from the bottom of the receptacle to facilitate manufacture and to eliminate the necessity of providing the openings 15. Other modifications and changes may be resorted to provided they fall within the spirit and scope of the invention as hereinafter defined by the appended claims.

I claim:

1. A plant holder comprising a receptacle having an open top and a closed bottom, said receptacle having an upwardly opening well in the central portion thereof and a reservoir formed in a side wall and at least partially surrounding said well, said reservoir being closed except for a passage adjacent its bottom communicating with the bottom portion of the well, vent means for venting air from the upper portion of said reservoir to permit water to flow from the reservoir to the well through said passage, said vent means opening into the well adjacent its bottom and into the reservoir adjacent its top whereby water from the reservoir will be prevented from rising in the well above the level of the upper edge of the end of the vent means which opens into the well or the upper edge of said passage.

2. A plant holder as in claim 1, said vent means comprising a tube disposed in the reservoir having a lower end opening into the well and an upper end opening into the reservoir and adjacent the top thereof, and a second tube having one end detachably connected to the lower end of the first mentioned tube and extending upwardly therefrom through the well, the opposite end of the second tube opening above the well and cooperating with the first mentioned tube for venting the reservoir while it is refilled through said passage by water supplied to the well.

EVERETT WHITE.

REFERENCES CITED

The following references are of record in the file of this patent:

UNITED STATES PATENTS

| Number | Name | Date |
| --- | --- | --- |
| 2,228,892 | Zimmerman | Jan. 14, 1941 |
| 2,288,678 | Blumentritt | July 7, 1942 |

FOREIGN PATENTS

| Number | Country | Date |
| --- | --- | --- |
| 22,840 | Great Britain | Nov. 28, 1893 |